Feb. 25, 1964   J. R. DIECKMANN   3,121,912
CONTINUOUS VULCANIZATION OF SHEETED RUBBER
Filed Oct. 18, 1961   2 Sheets-Sheet 1

Feb. 25, 1964 — J. R. DIECKMANN — 3,121,912
CONTINUOUS VULCANIZATION OF SHEETED RUBBER
Filed Oct. 18, 1961 — 2 Sheets-Sheet 2

United States Patent Office 3,121,912
Patented Feb. 25, 1964

3,121,912
CONTINUOUS VULCANIZATION OF
SHEETED RUBBER
James Robert Dieckmann, 2471 16th St.,
Cuyahoga Falls, Ohio
Substituted for abandoned application Ser. No. 814,794,
May 21, 1959. This application Oct. 18, 1961, Ser. No. 147,130
1 Claim. (Cl. 18—6)

This invention relates to means for vulcanizing sheets of rubber and more particularly to means for semi-vulcanizing continuous, traveling sheets of tire chafer rubber.

Tire beads usually are protected from the abrasive rubbing of a wheel rim by abrasion-resistant rubber chafers on their rim-engaging surfaces. Such chafers may include strips of abrasion-resistant rubber cut from a continuous sheet which is first semi-vulcanized to give the rubber enough body to resist being squeezed from the tire bead surfaces by the pinching action of the mold and curing bag when the tire is molded and vulcanized. In its preferred form, the invention is used to effect semi-vulcanization of a continuous rubber strip used as a tire chafer.

A problem in vulcanization is that most rubber compounds give off gases when heated to temperatures within their vulcanization range. The rate at which these gases evolve increases with temperature and ranges from gradual effusion, which does not substantially affect the structure of the rubber, to violent eruption, which makes the rubber unsuitably porous. Vulcanization rates also increase with temperature, and are usually economically feasible only at those temperatures which give the latter result.

In conventional rubber sheet vulcanizing apparatus, porosity is avoided at higher vulcanization temperatures by subjecting the rubber to pressure high enough to keep the gases in solution by sandwiching it between a heating drum and a highly tensioned endless hugger belt. Such an arrangement is not entirely satisfactory because the means used to apply tension required in the belt makes the apparatus massive and expensive. Also, such apparatus is unsatisfactory for vulcanizing rubber sheets at reduced pressure because the liberated gases become trapped between the rubber sheet and the belt and form pockets which pockmark the surface of the sheet.

The present invention avoids these and other disadvantages of the prior-art by an arrangement of apparatus that includes pervious members to transmit pressure to a rubber sheet and to permit escape of gas during vulcanization.

Accordingly, it is an object of this invention to provide means for vulcanizing a traveling continuous sheet of rubber.

Another object is to provide apparatus which is less massive and less expensive than previously known apparatus for vulcanizing traveling continuous rubber material.

Yet another object is to provide means to permit the escape of effused gases from the surface of a traveling rubber sheet subjected to mechanical pressure during its vulcanization.

It is another object of this invention to provide vulcanizing apparatus which includes pervious members adapted both to transmit pressure to a traveling sheet of rubber and to bleed off gases evolved during vulcanization of the sheet.

Still another object is to provide means for transmitting pressure to surfaces of a traveling rubber sheet while simultaneously permitting gases liberated from the sheet to bleed off through the pressure-transmitting means to the atmosphere.

The preferred embodiment of the invention will be described in detail with reference to the accompanying drawings in which.

Figure 1:
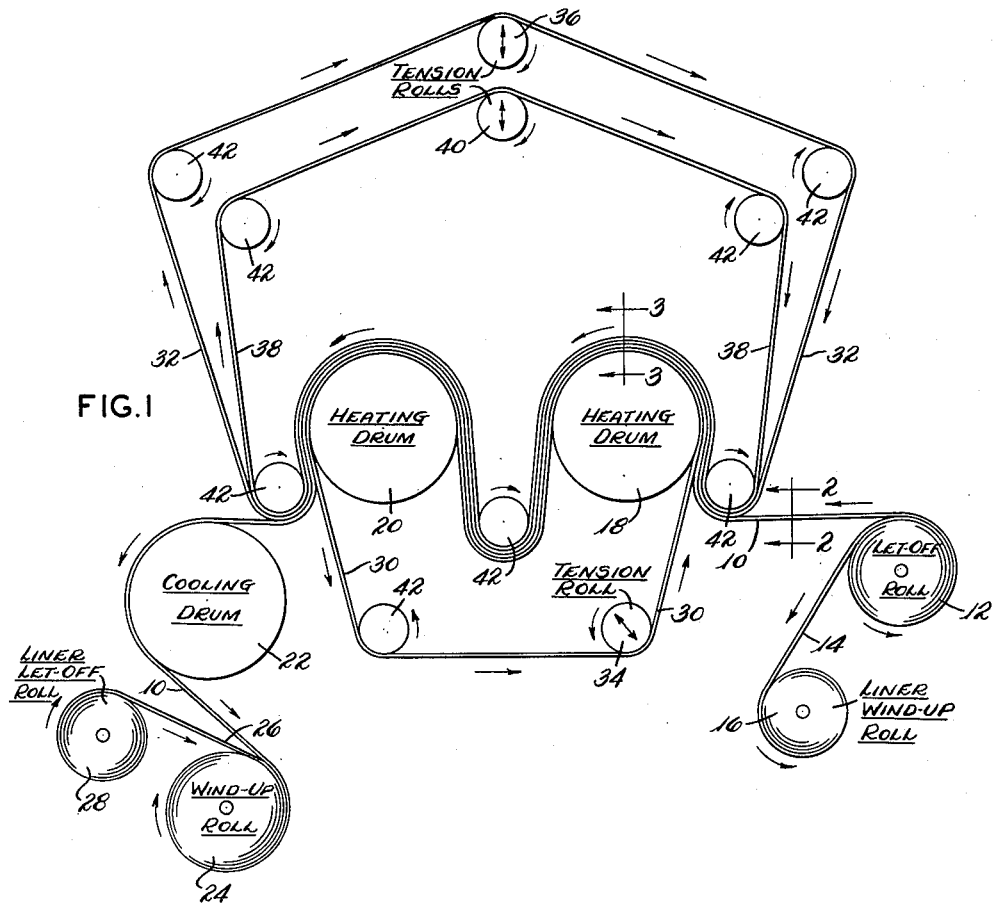
FIGURE 1 is a diagrammatic view in elevation of a preferred form of vulcanizing apparatus incorporating the present invention.
Figure 2:
FIGURE 2 is an enlarged fragmentary sectional view taken along line 2—2 of FIGURE 1.

In the preferred form of the invention shown in FIGURE 1, a continuous unvulcanized rubber sheet 10 is threaded through the apparatus from a let-off roll 12 in which it is stored in alternate convolutions with a protective liner 14. As the sheet is pulled from the let-off roll, liner 14 is separated from the sheet and wound upon a liner wind-up roll 16. In traveling through the apparatus, sheet 10 passes over a heating drum 18, a power-driven heating drum 20, a cooling drum 22, and finally onto a power-driven roll 24 upon which it is wound in alternate convolutions with a protective liner 26 pulled from a liner let-off roll 28.

Figure 3:
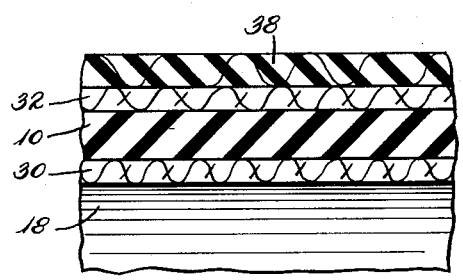
FIGURE 3 is an enlarged fragmentary sectional view taken along line 3—3 of FIGURE 1.

As the sheet passes over the heating drums, it is sandwiched between two endless pervious fabric belts 30 and 32 (FIGURE 3).

An endless hugger belt 38 of fabric-reinforced rubber passes over the heating drums in the radially outermost position shown in FIGURE 3, and presses the sandwich comprised of the rubber sheet 10 and the belts 30 and 32 against those drums. Roll 40, adjustable along the line indicated by the arrow, tensions belt 38 against the drums to apply pressure against sheet 10 as it moves over the drums while rolls 34 and 36, adjustable along the lines indicated by the arrows, pull belts 30 and 32, respectively, taut against the heating drums. Idler rolls such as 42 support and position the belts in a manner which results in a large contact area between them and the drums.

Figure 4:
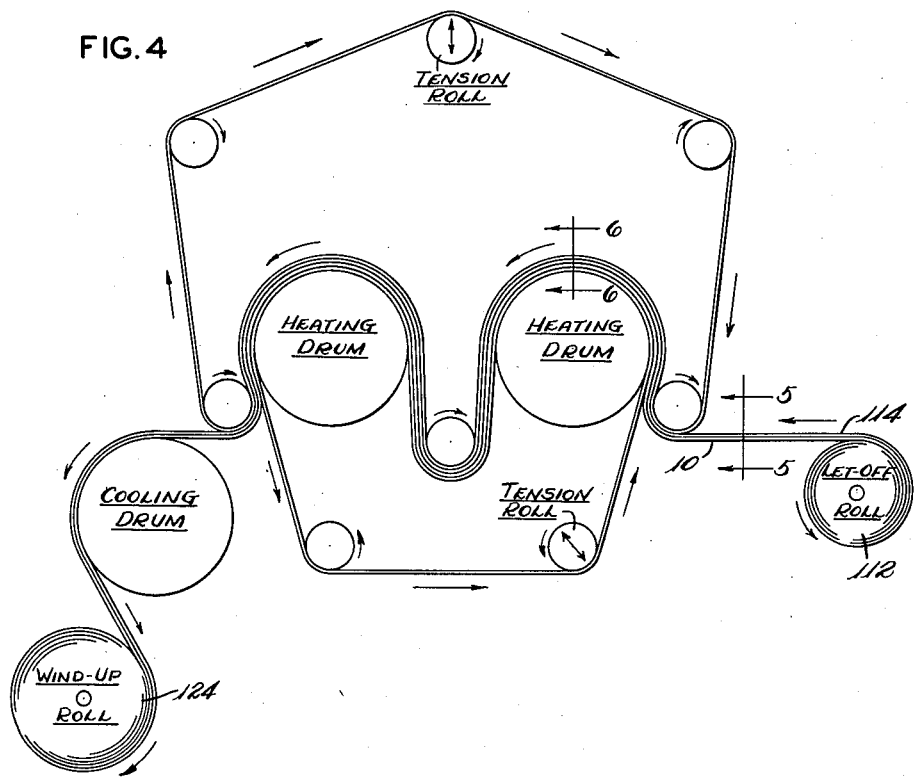
FIGURE 4 is a diagrammatic view in elevation of a modification of the vulcanization apparatus shown in FIGURE 1.
Figure 5:
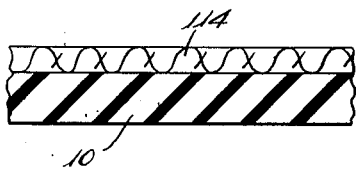
FIGURE 5 is an enlarged fragmentary sectional view taken along line 5—5 of FIGURE 4.
Figure 6:
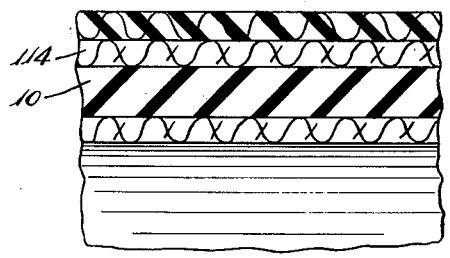
FIGURE 6 is an enlarged fragmentary sectional view taken along line 6—6 of FIGURE 4.

In the modification of the invention shown in FIGURE 4, pervious belt 32 and its associated rolls 36 and 42 and liner rolls 16 and 28 (FIGURE 1) are omitted. Sheet 10 and a protective liner 114 of pervious fabric are threaded through the apparatus from a roll 112 in which they are stored in alternate convolutions. After passing through the apparatus, the sheet and liner 114 are wound in alternate convolutions on a roll 124. A comparison of FIGURES 3 and 6 shows that liner 114 of the modified apparatus replaces belt 32 of the preferred apparatus in providing a pervious layer between the sheet and the hugger belt.

Various elements of the apparatus shown diagrammatically in FIGURES 1 and 4 are similar to elements shown and described in U.S. Patents Nos. 2,093,904 and 2,442,443 and are typical of drum-vulcanizing apparatus well-known by those skilled in the art. Because of this fact, only those parts of the conventional apparatus necessary for an understanding of the invention have been shown and described with the inventive improvements.

In the operation of the preferred form of the apparatus to vulcanize a continuous sheet 10 of chafer rubber, a storage roll 12 containing the sheet and a liner 14 is positioned in the apparatus as shown in FIGURE 1. Power is applied to rotate heating drum 20 which drives the tensioned belts 30, 32, and 38 in the directions indicated by the arrows. The belts, in turn, drive heating drum 18.

Liner 14 is separated from sheet 10 and wound on roll 16 as adjacent convolutions of sheet and liner are unwound together from roll 12. Sheet 10 is sandwiched between belts 30 and 32 and carried over heating drums 18 and 20 where it is semi-vulcanized while subjected to the pressure exerted by hugger belt 38.

After leaving drum 20, the belts move away from each other and release the sandwiched sheet which then moves over drum 22 where it is cooled to stop vulcanization. After the cooled and partially vulcanized sheet leaves drum 22, it is wound onto roll 24 in alternate convolutions with protective liner 26 pulled from roll 28.

Sheet 10 is heated to vulcanizing temperature in passing over drum 18, and gases are formed within the sheet. The gases escape from the top and bottom surfaces of the sheet and pass into air spaces in pervious belts 32 and 20, respectively, and move along the cords of the fabric to escape to the atmosphere.

As more and more gas effuses from the sheet, the diminishing concentration of the remaining gas raises the temperature threshold at which violent gas evolution occurs. By the time the partially vulcanized sheet leaves drum 18, it is able to withstand a higher vulcanization temperature without becoming porous. Accordingly, the vulcanization is continued at this higher temperature as the sheet passes over drum 20.

Belt 30 also serves as a barrier to reduce the rate of heat conduction from the heating drums to the sheet, and belt 32 insulates the top surface of the sheet against heat loss (FIGURE 3). As a result of the insulating properties of the belts, the sheet is brought to the vulcanizing temperature uniformly throughout its thickness without the formation of localized hot spots that often cause porosity.

The preferred form of the invention has been successfully used to effect the semi-vulcanization of many rubber materials having properties that make them suitable for use as tire chafers. A typical example of such materials has the following formulation in which the quantities of the components are expressed as parts per hundred parts by weight of rubber hydrocarbon:

| | |
|---|---|
| Rubber | 100 |
| Carbon black | 40 |
| Zinc oxide | 3 |
| Stearic acid | 2.5 |
| Softeners | 5 |
| Antioxidant | 1.5 |
| Sulfur | 3 |
| Accelerator | 1 |
| Retarder | 0.5 |
| | 156.5 |

Several gas-pervious fabrics were tried in belts 30 and 32 and in liner 114, and among those found to be suitable were 8-ounce cotton duck, 8-ounce rayon duck, and 36-mesh stainless-steel cloth.

A set of conditions under which a continuous rubber sheet has been vulcanized by the apparatus of the preferred form of the invention is as follows:

| | | |
|---|---|---|
| Temperature of drum 18 | °F | 290 |
| Temperature of drum 20 | °F | 320 |
| Pressure exerted by belt 38 | p.s.i. | 7 |
| Tension in belt 38 | lbs. | 3800 |
| Total time of vulcanization | min. | 10 |

It was found that by using the apparatus of the preferred form of the invention, the pressure exerted against the surface of the rubber to prevent porosity could be reduced to 7 p.s.i. from the 50 p.s.i. used in comparable drum-vulcanizing apparatus of conventional type. This reduction in pressure against the surface of the rubber permits a corresponding seven-fold reduction of tension in the hugger belt of from 27,000 pounds to 3800 pounds. The apparatus to produce this tension is less-massive and less-expensive than drum vulcanizing apparatus previously used.

This application is a substitute for application 814,794, filed May 21, 1959, and now abandoned.

Various modifications may be made to the apparatus without departing from the scope of the invention as defined by the following claim.

What is claimed is:

Apparatus for vulcanizing a continuous rubbery sheet comprising first and second rotating vulcanizing drums of different temperatures, hugger means pressing on said drums, outer and inner insulating means comprising gas-pervious belts movable over said drums and there sandwiching said sheet by its entire surfaces, said belts being intermediate said vulcanizing drums and said hugger means, and means to advance the sandwich structure from said first drum of lower temperature to said second drum of higher temperature, whereby a majority of the gases is evolved from within said sheet during its passage over said first drum.

References Cited in the file of this patent

UNITED STATES PATENTS

| | | |
|---|---|---|
| 2,463,289 | Leguillon | Mar. 1, 1949 |
| 2,782,461 | Esslinger | Feb. 26, 1957 |